Figure 1:
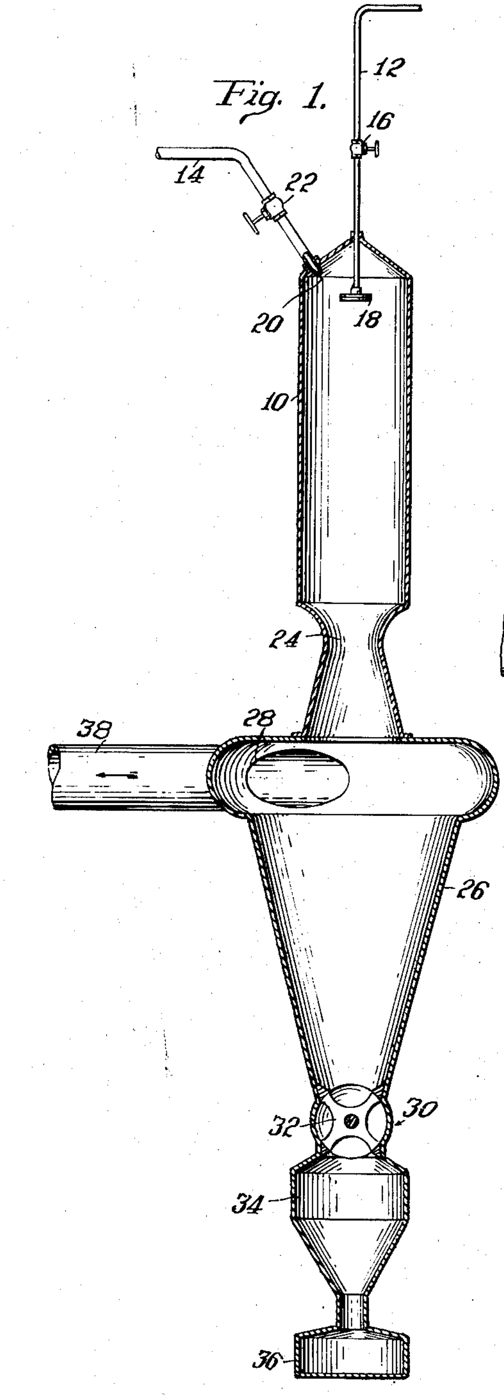

March 1, 1955

F. A. PARKER, JR 2,702,949

APPARATUS FOR DRYING

Filed March 7, 1952

INVENTOR

Frank A. Parker Jr.

BY Stowell & Evans

ATTORNEY

United States Patent Office 2,702,949
Patented Mar. 1, 1955

2,702,949

APPARATUS FOR DRYING

Frank A. Parker, Jr., Princeton, N. J., assignor to Research Corporation, New York, N. Y., a corporation of New York Application March 7, 1952, Serial No. 275,253

3 Claims. (Cl. 34—57)

This invention relates to apparatus for dehydrating or drying solutions, suspensions of substances, moist solids or semi-solids, at high velocity and temperatures, and more particularly, to apparatus for dehydrating to a powder form substances that are heat sensitive, oxidation sensitive, or both.

It is an object of the invention to provide means for dehydrating substances employing a superheated gaseous medium and extremely high velocities whereby the dehydrating operation is rapidly carried out providing a continuous process involving high rates of heat transfer.

A further object of the invention is to provide such a process wherein the substance to be dehydrated remains relatively cool during the dehydration process.

Another object of the invention is to provide a dehydrating process which may be carried out substantially in the absence of oxygen, consequently substantially eliminating the oxidation of oxidation-sensitive substances.

A further object is to provide a process for dehydrating substances and apparatus for carrying out the same, that is readily adaptable to various conditions, temperatures and reaction rates, and whereby positive control of the degree of dehydration and rate of desiccation may be obtained.

These and other objects and advantages are provided by the process of the invention which generally comprises establishing a flow of dehydrating gaseous medium through a chamber, dispensing the substance to be dried into the gaseous medium in the chamber, passing the dispersion through a constricted opening into an expansion zone, causing the gaseous medium to turn sharply in passing through the expansion zone to separate dispersed substances therefrom by centrifugal force, withdrawing gaseous medium from the expansion zone, and removing the separated substance from the expansion zone, and by the apparatus which generally comprises in combination means defining an elongated chamber, conduit means for introducing a dehydrating gas into one end of the chamber, spray means for dispersing a substance to be dried into the one end of the chamber, an expansion chamber, and constricted conduit means connecting the other end of the elongated chamber with the expansion chamber, the expansion chamber including a gas outlet disposed with reference to the inlet of the constricted conduit means to cause the gas to turn sharply in passing from the constriction to the gas outlet, and an outlet for the dried substance spaced from the inlet and from the gas outlet.

Figure 2:
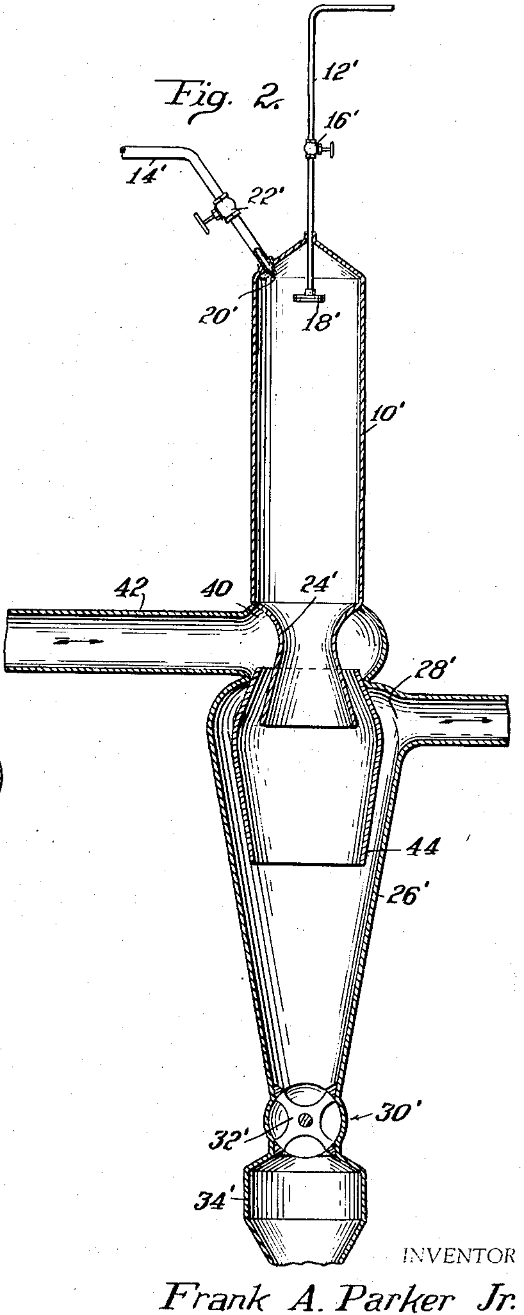

The invention will be more particularly described with reference to the illustrative embodiments thereof shown in the accompanying drawings in which:

Fig. 1 is a diagrammatic representation of a system of apparatus embodying the principles of the invention, portions thereof being shown in section for clarity; and Fig. 2 is a diagrammatic representation of a modified system of apparatus embodying the principles of the invention, portions thereof being shown in section.

With reference to Fig. 1 of the drawings, 10 is a drying chamber provided with suitable conduit means 12 for introducing the material to be dried into the chamber, and conduit means 14 for the introduction of a superheated gaseous medium, such as high pressure superheated steam.

Conduit 12 is connected to a source of the material to be dried, not shown, which may be any suitable storage tank, preconditioner or the like, and is provided with a valve 16 for regulating the rate of material fed to the nozzle 18. Nozzle 18 is of the spray injector type and is preferably designed to discharge a uniform droplet size. Similarly, conduit 14 is provided with a discharge nozzle 20 and a control valve 22 and the conduit is connected to a suitable source of high pressure gaseous medium, not shown.

The pressure within the chamber 10 is maintained at a predetermined lower pressure than the pressure of the drying medium in the conduit 14.

With the introduction of the high pressure superheated gaseous drying medium the particles to be dried are subjected to high temperature and evaporation takes place at their surface. As long as the particles are wet they remain relatively cool as the cooling effect of the evaporation of the liquid prevents any substantial temperature rise of the substance to be dried.

The reaction time of the particles to be dried within chamber 10 is controlled so that the particles will have travelled the length of the chamber 10 and reach the acceleration throat 24 by the time they become dry, or substantially dehydrated.

The throat 24 may be in the form of a venturi or constricted throat exhaust type nozzle. In the nozzle or throat 24 the substantially dry particles are accelerated to very high velocity and then the gaseous suspending medium is suddenly expanded into the expansion chamber 26 which is maintained at a substantially lower pressure than drying chamber 10.

The provision of the throat 24 between the drying and expansion chamber 10 and 26 has a three-fold function. First, since the particles to be dehydrated are dry or substantially dry at the point where they enter the venturi throat, there is substantially no surface cooling by evaporation and heat transfer from the drying medium to the particles to be dried becomes critical. Therefore, by ejecting these particles through the throat into the expansion chamber at high velocity the time of exposure to undue heating is correspondingly reduced to a minimum. Second, as the particles are ejected through the throat they rapidly enter the expansion chamber maintained at a lower pressure, and if the particle is not entirely dry, further evaporation of liquid occurs with consequent cooling of the particle, and if the particle is already dry, it is brought into a lower temperature environment. Third, by utilizing the high kinetic energy of the ejected particles entering the expansion chamber it is possible to separate the particles from the gaseous medium centrifugally.

The centrifugal separation of the dry particles from the gaseous drying medium is effected in the expansion chamber 26 and is accomplished by providing an outlet 28 at the upper end of chamber 26 for the gaseous medium and an outlet 30 comprising, for example, a rotary air lock valve 32 for the discharge of the dry particles into a suitable receiving chamber and container 34 and 36, respectively, at the bottom of the expansion chamber.

The outlet 28 for the gaseous medium may be provided with a conduit 38 to direct the drying medium to suitable heat exchanges, condensors, separators, reheaters or the like, or the outlet 28 may exhaust directly into the atmosphere.

In operation of the method of the invention a temperature $Te$ for the expansion chamber 26 is first selected, as the temperature in this chamber is a critical factor. In selecting the expansion chamber temperature, the heat sensitivity of the material to be dried is generally the governing factor. A corresponding pressure $Pe$ for the expansion chamber is selected to assure that the gaseous medium will be in a dry superheated state in this chamber. Next an appropriate pressure $Pd$ for the drying chamber is calculated so that the ratio of the pressure in the expansion chamber to the pressure in the drying chamber is great enough to produce a very high velocity through the venturi throat.

If the ratio of chamber pressure $Pd$ to expansion chamber pressure $Pe$ is large enough, the velocity of the gases at the throat of the venturi is sonic. This relationship may be shown as follows:

The critical pressure ratio $$\left(\frac{Pd}{Pe}\right)_{Cr}=\left(\frac{K+1}{2}\right)\frac{K}{K-1}$$

and $$V_t=\sqrt{\frac{2gKRTd}{K+1}}$$

exist where:

$Vt$=velocity of the gases at the throat
$g$=acceleration of gravity in feet per second per second $$K=\frac{C_p}{C_v}=\text{specific heat ratio}$$

$R$=gas constant=1545/m.
$Td$=drying chamber temperature
$Pd$=drying chamber pressure.
$Pe$=expansion chamber pressure From the temperature and pressure of the superheated gaseous medium injected into the drying chamber, and the temperature, pressure and enthalpy T$d$, P$d$ and $hd$ in the drying chamber, the ratio of superheated drying medium to the amount of liquid to be evaporated may be approximated as follows:

$$\frac{Wa}{Wc}=\frac{hd}{hc-hd}=\frac{\text{enthalpy per pound at nozzle}}{\text{charge in enthalpy per pound through the drying chamber}}$$

where:

W$a$ and W$c$ equals the weight per second of superheated drying gas at the injection nozzle and the weight per second of water present in the material to be dried (assuming that the enthalpy of the solids are negligible).

A nozzle connecting the drying chamber with the expansion chamber having the correct dimensions may be selected through the use of the following equation:

$$Wb=\frac{At\cdot Pd\cdot Cd}{\sqrt{RTd}}\cdot\sqrt{\frac{2gK}{K-1}}\cdot\left(\frac{Pe}{Pd}\right)^{1/K}\cdot\sqrt{1-\left(\frac{Pe}{Pd}\right)^{\frac{K-1}{K}}}$$

where:

W$b$ is equal to the weight of gases flowing through the nozzle in pounds per second
A$t$ is the area of the throat in square inches
C$d$ is the nozzle discharge coefficient.

If oxidation is not a serious problem, or where more substantial immediate cooling is required as the particles enter the expansion chamber, air, or an inert gaseous medium is introduced into the accelerated stream of particles and superheated gaseous medium. Apparatus adapted for accomplishing the method of this form of the invention is shown in Fig. 2 of the drawings in which 10' is the drying chamber having a conduit means 12' for introducing the material to be dried into the chamber, and conduit means 14' for the introduction of superheated gaseous drying medium.

Conduit 12' is provided with an injector type spray nozzle 18' and a flow control valve 16', while conduit 14' may be provided with a discharge nozzle and valve 20' and 22', respectively. The particles to be dehydrated and the dehydrating medium are drawn toward the lower end of chamber 10'. At this stage of the dehydrating process, the particles are dry or substantially dry and they are then accelerated through the throat of venturi 24' into the expansion chamber 26' which is maintained at a substantially lower pressure than the drying chamber 10'. Adjacent the acceleration throat 24' is provided an opening 40 and conduit means 42 for directing air at, for example, atmospheric pressure and temperature or a suitable gaseous medium, about the outer surface of the throat 24'. A baffle member 44 about the discharge end of the venturi directs the cooling medium into contact with the expanding superheated drying gases and the suspended dry particles from chamber 10' thus rapidly cooling them. A sufficient excess of cooling air is introduced to prevent condensation of water vapor.

The dry particles are then separated from the superheated gaseous medium and the cooling gaseous medium by centrifugal separation, accomplished by providing an outlet 28' in the upper portion of chamber 26' for the gaseous products and an outlet 30' comprising for example a rotary air lock valve 32' for the discharge of dry particles at the bottom of the expansion chamber 26'. A suitable receiving chamber, such as 34' may be provided at the bottom of the expansion chamber to receive the dry material.

From the foregoing description, it will be seen that the present invention provides improved methods and apparatus for drying whereby the aims, objects and advantages of the invention are fully accomplished.

I claim:

1. Drying apparatus comprising in combination means defining an elongated drying chamber, conduit means for introducing a dehydrating gas into one end of the drying chamber, spray means for dispersing a substance to be dried into said end of the drying chamber, an expansion chamber, means to accelerate the substantially dry dispersion to very high velocity connecting the other end of the drying chamber with the expansion chamber, said means comprising a venturi conduit including a constricted outlet followed by a gradually expanding passage in axial alignment with said conduit having said constricted outlet, the expansion chamber including a gas outlet disposed with reference to the gradually expanding passage of the dispersion accelerating means to cause the gas to turn sharply in passing from said gradually expanding passage to the gas outlet, and an outlet for the dried substance spaced from the gradually expanding passage and from said gas outlet.

2. Drying apparatus comprising in combination means defining an elongated drying chamber, conduit means for introducing a dehydrating gas into one end of the drying chamber, spray means for dispersing a substance to be dried into said end of the drying chamber, an expansion chamber, means to accelerate the substantially dry dispersion to very high velocity connecting the other end of the drying chamber with the expansion chamber, said means comprising a venturi conduit including a constricted outlet followed by a gradually expanding passage in axial alignment with said conduit having said constricted outlet, the expansion chamber including a gas outlet disposed with reference to the gradually expanding passage of the dispersion accelerating means to cause the gas to turn sharply in passing from said gradually expanding passage to the gas outlet, conduit means for the introduction of cooling gas into the expansion chamber adjacent the venturi conduit, and an outlet for the dried substance spaced from the gradually expanding passage and from said gas outlet.

3. A drying apparatus as defined in claim 2 including baffle means positioned in the expansion chamber between said venturi conduit and the means for introducing gas into the expansion chamber.

References Cited in the file of this patent

UNITED STATES PATENTS

| | | |
|---|---|---|
| 1,430,403 | Plummer | Sept. 26, 1922 |
| 1,471,765 | Wilson | Oct. 23, 1923 |
| 1,983,434 | Black et al. | Dec. 4, 1934 |
| 2,494,153 | Andrews et al. | Jan. 10, 1950 |
| 2,555,516 | Stoneman | June 5, 1951 |

FOREIGN PATENTS

| | | |
|---|---|---|
| 435,388 | Germany | Oct. 13, 1926 |